(12) United States Patent
Dournel

(10) Patent No.: US 8,936,820 B2
(45) Date of Patent: Jan. 20, 2015

(54) PROCESS FOR THE MANUFACTURE OF OXIDIZED STARCH, OXIDIZED STARCH AND ITS USE

(75) Inventor: Pierre Dournel, Brussels (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 13/375,683

(22) PCT Filed: Jun. 2, 2010

(86) PCT No.: PCT/EP2010/057712
§ 371 (c)(1),
(2), (4) Date: Dec. 1, 2011

(87) PCT Pub. No.: WO2010/139727
PCT Pub. Date: Dec. 9, 2010

(65) Prior Publication Data
US 2012/0070554 A1 Mar. 22, 2012

(30) Foreign Application Priority Data

Jun. 5, 2009 (EP) .................................... 09162083

(51) Int. Cl.
*C08B 31/18* (2006.01)
*A23L 1/0522* (2006.01)
*D21H 17/28* (2006.01)
*D21H 19/54* (2006.01)

(52) U.S. Cl.
CPC ............. *C08B 31/18* (2013.01); *A23L 1/05223* (2013.01); *D21H 17/28* (2013.01); *D21H 19/54* (2013.01)
USPC ......................................... 426/442; 162/175

(58) Field of Classification Search
CPC ...................................................... C08B 31/18
See application file for complete search history.

(56) References Cited

U.S. PATENT DOCUMENTS

| | | | |
|---|---|---|---|
| 2,276,984 A | 3/1942 | Kauffmann et al. | |
| 2,307,684 A | 1/1943 | Kauffmann et al. | |
| 3,450,692 A | 6/1969 | Hyldon et al. | |
| 3,655,644 A | 4/1972 | Durand | |
| 4,838,944 A | 6/1989 | Kruger | |
| 5,329,024 A | 7/1994 | Jureller et al. | |
| 5,716,441 A * | 2/1998 | Nguyen et al. | 106/207.1 |
| 5,833,755 A | 11/1998 | Schlom et al. | |
| 6,372,361 B1 | 4/2002 | Mackewicz et al. | |
| 6,670,470 B1 | 12/2003 | Ketola et al. | |
| 7,015,358 B2 | 3/2006 | Suss-Fink et al. | |
| 7,034,170 B2 | 4/2006 | Bosch et al. | |
| 2003/0051726 A1 | 3/2003 | Leininger et al. | |
| 2003/0088089 A1 | 5/2003 | Gnad et al. | |
| 2005/0229925 A1 | 10/2005 | Ketola | |

FOREIGN PATENT DOCUMENTS

| | | |
|---|---|---|
| CN | 1580076 A | 2/2005 |
| CN | 101104642 A | 1/2008 |
| DE | 10024617 A1 | 12/2000 |
| EP | 0049009 A1 | 4/1982 |
| KR | 20020067328 A | 8/2002 |
| WO | WO 0015670 A1 | 3/2000 |
| WO | WO 03018638 A1 | 3/2003 |
| WO | WO 2006125517 A1 | 11/2006 |
| WO | WO 2007096401 A1 | 8/2007 |

OTHER PUBLICATIONS

U.S. Appl. No. 12/278,824, Pierre Dournel, et al., filed Aug. 8, 2008.

* cited by examiner

*Primary Examiner* — Layla Bland
*Assistant Examiner* — Bahar Craigo
(74) *Attorney, Agent, or Firm* — Xuping Fu

(57) ABSTRACT

Batch process for the manufacture of oxidized starch by contacting an aqueous medium comprising already oxidized starch with native starch and with at least one oxidizing agent selected from a peroxide compound or from an alkali metal hypochlorite, and by reacting them at a temperature below the gelatinization temperature of the native starch and of the oxidized starch, the reaction being conducted in the presence of a homogeneous manganese-based complex coordination catalyst when the oxidizing agent is a peroxide compound. The resulting oxidized starch can be used as an additive for the paper industry or for the food industry.

13 Claims, No Drawings

PROCESS FOR THE MANUFACTURE OF OXIDIZED STARCH, OXIDIZED STARCH AND ITS USE

CROSS-REFERENCE TO RELATED APPLICATIONS

The present application is a U.S. national stage entry under 35 U.S.C. §371 of International Application No. PCT/EP2010/057712 filed Jun. 2, 2010, which claims the benefit of the European application no. 09162083.1 filed on Jun. 5, 2009, the whole content of this application being herein incorporated by reference for all purposes.

TECHNICAL FIELD OF THE INVENTION

The present invention is related to a process for the manufacture of oxidized starch. In particular, it is related to the manufacture of oxidized starch which can serve as additive for the paper industry or for the food industry.

BACKGROUND

In the food industry, as disclosed in the international application WO 00/15670, oxidized starch can be used as a thickener, for example in sauces, or to replace Arabic gum in products such as confectioneries.

It is also known to use oxidized starch as an additive for the paper industry. In this field, the purpose of adding the oxidized starch is usually to improve the strength of the paper sheet, and/or to result in a better printability of the paper sheet, and/or a better retention of cationic additives, and/or to improve its applicability as glue for the paper fibers. For instance, oxidized starches have been used as coating binders, as disclosed in the international application WO 00/15670.

The oxidation of starch is usually carried out in order to reduce the viscosity of the starch in solution or dispersion. During the oxidation reaction, starch molecules are broken down, yielding molecules having a decreased molecular weight.

The oxidation process can be carried out using an alkali metal hypochlorite or a peroxide such as hydrogen peroxide as oxidizing agent.

An example based on the use of hypochlorite as oxidant is given in the international application WO 03/018638. When hydrogen peroxide is used, the oxidation reaction is generally conducted in the presence of a catalyst such as a metal catalyst in order to shorten the reaction time. For example, WO 00/15670 discloses the use of copper catalysts. Another example is the use of manganese-based complex coordination catalysts, disclosed in U.S. Pat. No. 5,833,755.

However, the oxidized starch thus obtained is not suitable as additive for the paper industry and for the food industry. Indeed, the resulting oxidized starch usually has a too low viscosity for most of the required applications and/or the viscosity is not stable as retrogradation is observed, leading to the formation of a gel.

SUMMARY

The purpose of the present invention is to provide a new process for the manufacture of oxidized starch which does not present the above disadvantages and which enables to obtain oxidized starch which is convenient as additive for the paper industry or for the food industry. In particular, the purpose of the present invention is to provide a new process for the manufacture of oxidized starch having a high viscosity in solution, this viscosity being stable (no gel formation), while keeping a similar level of carboxylic acid group content compared to oxidized starch obtained by known methods.

The present invention therefore relates to a process, especially to a batch process, for the manufacture of oxidized starch by contacting an aqueous medium comprising already oxidized starch with native starch and with at least one oxidizing agent selected from a peroxide compound or from an alkali metal hypochlorite, and by reacting them at a temperature below the gelatinization temperature of the native and of the oxidized starches, the reaction being conducted in the presence of a homogeneous manganese-based complex coordination catalyst when the oxidizing agent is a peroxide compound.

Native starch is a carbohydrate present in nature in all plants, especially in plant seeds, roots and tubers, where it functions as a nutrient reserve for the new growing season. Starch is a glucose polymer in which anhydroglucose units are linked to each other by an a-D-glucosidic bond. Glucose chains are either linear or slightly branched, amylose, or highly branched, amylopectin. Usually, the amylase molecules have a degree of polymerization of 1,000 to 5,000 and amylopectin molecules have an average degree of polymerization of 1,000,000 or more. Starch can be isolated, among others, from rice, maize, potatoes, wheat, cassava (manioc), tapioca, barley, oat, millet, and sorghum. Modified starch is a starch prepared by at least partially degrading native starch, for example by treating native starch with inorganic acids, alkaline compounds, bleaching agents, oxidizing agents, enzymes, or acetylating agents. Oxidized starch is a modified starch prepared by treating native starch with at least one oxidizing agent.

One of the essential features of the present invention is to perform the oxidation of the starch in the presence of already oxidized starch, namely to treat a mixture of native starch and of already oxidized starch by at least one oxidizing agent. Indeed, it has surprisingly been found that, by performing the oxidation of a mixture of native starch and of already modified starch, it is possible to obtain an oxidized starch having a higher viscosity in solution, this viscosity being stable (no gel formation), while keeping a similar level of carboxylic acid group content compared to oxidized starch obtained by methods conducted in one oxidation step. The oxidized starch obtained according to this invention presents the ideal characteristics to serve as additive for the paper industry and for the food industry.

Another essential feature of the present invention is to select the at least one oxidizing agent among the group consisting of peroxide compounds and alkali metal hypochlorites. Indeed, in the presence of other oxidizing agents such as periodates or permanganates, the oxidation of the starch will be more complete and a high amount of carboxylic acid groups will be formed, in particular more than 10% of carboxylic acid groups on dry basis (method ISI 10), for example 40 or 50% on dry basis. This will result in starches that are soluble at room temperature and have a very low viscosity. Such starches are not suitable for the paper and the food industry.

DETAILED DESCRIPTION

According to the process of the invention, the aqueous medium comprising the already oxidized starch can be contacted concomitantly or sequentially with the native starch and the oxidizing agent, in any sequence. Preferably, the aqueous medium comprising the already oxidized starch is first contacted with the native starch, then the resulting aqueous medium comprising the already oxidized starch and the native starch is contacted with the oxidizing agent. The native starch can be added to the aqueous medium comprising the already oxidized starch as dry native starch or as an aqueous slurry of native starch.

In the present invention, the generic term "aqueous slurry" is used to define the mixture of starch and water. This term includes solutions, dispersions and/or suspensions of the starch in water.

In the present invention, the already oxidized starch is usually present in the aqueous medium comprising the already oxidized starch and the native starch in an amount of at least 20% of dry starch by weight and preferably of at least 25% by weight. Typically, the amount of native starch added to the aqueous medium containing the already oxidized starch is of at least 1% by weight of the amount of already oxidized starch, preferably at least 2% by weight, more preferably at least 5% by weight. The amount of native starch is usually of at most 150% by weight of the amount of already oxidized starch, in particular at most 100% by weight, especially at most 50% by weight, more especially at most 20% by weight. The amount of native starch may for example be from 5 to 10% by weight or from 10 to 20% by weight, for instance around 10% by weight.

In a preferred embodiment, the native starch is added to the aqueous medium comprising the already oxidized starch prior to the addition of the oxidizing agent, forming an aqueous composition comprising the already oxidized starch and the native starch, and the pH of said aqueous composition is adjusted, prior to the addition of the oxidizing agent, to a value of more than or equal to 9 and of less than or equal to 12.5, preferably of less than or equal to 12, more preferably of less than or equal to 11, in particular of less than 11. A suitable pH range is from 9 to below 11, preferably from above 9 to 10.5, a value around 10 being especially suitable. The pH is preferably adjusted prior to the addition of the oxidizing agent, to avoid degradation of the oxidizing agent, which could occur if the pH of the aqueous composition to which the oxidizing agent is added is too low or too high, in particular if the pH is below 9. Indeed, without being bound by any theory, it is believed that the degradation reaction of the oxidizing agent could be faster than the oxidation reaction of the starch, if the pH of the reaction medium is below 9. The pH is advantageously adjusted to a value of maximum 12.5, to avoid decreasing the temperature of the gelatinization of the native starch and of the already oxidized starch below the working temperature. Working at a pH above 12.5 would also be less economical. The pH of said aqueous composition may be adjusted by the addition of any pH adjusting compound known in the art, including acid and alkaline compounds selected from any water soluble bases and acids known in the art. Examples of suitable acids are acids selected from water soluble organic acids and inorganic acids, especially from sulfuric acid, hydrochloric acid, acetic acid, and formic acid. Examples of suitable bases are water soluble inorganic alkaline and alkaline earth hydroxides, carbonates or bicarbonates, for instance sodium hydroxide, potassium hydroxide, sodium carbonate, or sodium bicarbonate. The pH of aqueous medium is advantageously maintained substantially constant during the whole duration of the reaction, especially as long as some oxidizing agent is added to the aqueous medium.

In the process of the invention, the oxidizing agent may be selected from peroxide compounds and alkali metal hypochlorites. An especially suitable example of alkali metal hypochlorite is sodium hypochlorite. Suitable peroxide compounds that can be used in the process of the invention are hydrogen peroxide and any other peroxide capable of forming hydrogen peroxide in situ in the aqueous slurry. Examples of peroxide compounds capable of forming in situ hydrogen peroxide are sodium percarbonate, sodium perborate, peracids such as equilibrium grade peracetic acid, or mixtures thereof. The peroxide compound preferably consists of an aqueous hydrogen peroxide solution. Such hydrogen peroxide solutions often contain from 5 to 50% by weight of hydrogen peroxide, preferably from 10 to 40% by weight. Solutions containing about 35% by weight give good results.

In the process of the invention, the amount of oxidizing agent is usually lower than or equal to 10% by weight of the native starch, preferably lower than or equal to 5% by weight, more preferably lower than or equal to 3%, for instance about 1 to 2%.

The oxidizing agent may be added batchwise, stepwise, dropwise or continuously, especially, the full amount of oxidizing agent may be added at once or may be divided in several portions or may be added continuously. The oxidizing agent is preferably added progressively to the aqueous medium of native starch and already oxidized starch, especially sequentially after having been divided in several portions, in particular in 4 to 10 portions, for instance into 5 or 6 portions or more if larger amounts of peroxide are used. The portions may be added each 5 to 30 minutes, for example each 10 minutes.

According to the process of the invention, if the oxidizing agent is a peroxide compound, the reaction is conducted in the presence of a homogeneous manganese-based complex coordination catalyst. Such catalysts allow to perform the oxidation reaction of the present invention using peroxide compounds as oxidizing agents. Said combination is especially advantageous as it allows relatively mild conditions, for example working at room temperature, while having a good efficiency.

The homogeneous manganese-based complex coordination catalyst according to the present invention is typically a mononuclear or dinuclear complex of a Mn(III) or Mn(IV) transition metal.

In the process of the present invention, the catalyst usually contains at least one organic ligand containing at least three nitrogen atoms that coordinate with the manganese, for example 1,4,7-triazacyclononane (TACN), 1,4,7-trimethyl-1,4,7-triazacyclononane (Me-TACN), 1,5,9-triazacyclododecane, 1,5,9-trimethyl-1,5,9-triazacyclododecane (Me-TACD), 2-methyl-1,4,7-triazacyclononane (Me/TACN), 2-methyl-1,4,7-trimethyl-1,4,7-triazacyclononane (Me/Me-TACN), N,N',N"-(2-hyroxyethyl)1,4,7-triazacyclononane. In a preferred embodiment, the ratio of the manganese atoms to the nitrogen atoms is 1:3.

Catalysts suitable for the present process may also contain from 0 to 6 coordinating or bridging groups per manganese atom. When the homogeneous manganese based complex coordination catalyst is a mononuclear complex, coordinating groups are for example selected from —OMe, —O—CH$_2$—CH$_3$, or —O—CH$_2$—CH$_2$—CH$_3$. When the homogeneous based complex coordination catalyst is a dinuclear complex, bridging groups may be selected, among others, from —O—, —O—O—, or —O—CH(Me)-O—.

The catalyst used in the present process may also contain one or more monovalent or multivalent counterions leading to a charge neutrality. The number of such monovalent or multivalent counterions will depend on the charge of the manganese complex which can be 0 or positive. The type of the counterions needed for the charge neutrality of the complex is not critical and the counterions may be selected for example from halides such as chlorides, bromides and iodides, pseudohalides, sulphates, nitrates, methylsulfates, phosphates, acetates, perchlorates, hexafluorophosphates, or tetrafluoro-borates.

Examples of specific metal complexes that are especially useful in this invention are those having the following structures:

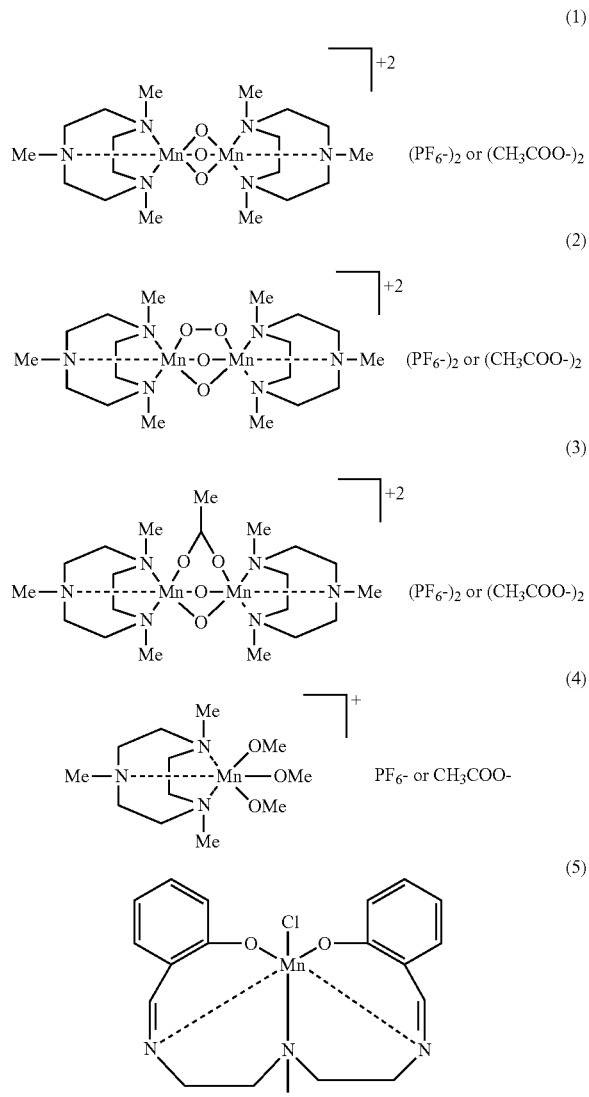

A particularly preferred catalyst is compound (I), di-manganese(IV)-tris(mu-oxo)-di(1,4,7-trimethyl-1,4,7-triazacyclononane)-bis(acetate) or [(Me-TACN)$_2$Mn$^{IV}_2$(µ-O)$_3$](CH$_3$COO)$_2$, known as Dragon's blood or Dragon A350.

According to the present invention, the catalyst may present in a total amount consisting of a first amount which is based on the weight of already oxidized starch, and of a second amount which is based on the weight of native starch. Typically, the catalyst is present in a first amount of from 10 to 500 ppm based on the weight of the already oxidized starch, preferably from 20 to 200 ppm, more preferably from 30 to 100 ppm. The process of the invention may be carried out in the optional presence of a second amount of catalyst which ranges from 0 to 500 ppm based on the weight of native starch, preferably from 10 to 200 ppm, more preferably from 20 to 100 ppm.

According to a preferred embodiment, the already oxidized starch used in the process of the present invention is obtained in a first oxidation step by reacting an aqueous slurry of native starch with at least one oxidizing agent selected from a peroxide compound or from an alkali metal hypochlorite, if the oxidizing agent is a peroxide compound, the reaction being conducted in the presence of a homogeneous manganese-based complex coordination catalyst if the oxidizing agent is a peroxide compound.

According to this preferred embodiment, the slurry of native starch in said first oxidation step typically initially comprises at least 20% by weight of dry native starch, preferably at least 25% by weight, for example about 30% by weight. The slurry of native starch is the first oxidation step generally comprises initially at most 60% by weight of dry native starch, in particular at most 50% by weight, for instance at most 40% by weight.

Still according to this preferred embodiment, the amount of oxidizing agent in said first oxidation step is in general less than or equal to 20% by weight calculated on the basis of the weight of dry native starch, in particular lower than or equal to 15% by weight, more particularly lower than or equal to 10% by weight, preferably less than or equal to 5% by weight, the most advantageous values being lower than or equal to 3% by weight, for instance about 2.5% by weight. The amount of peroxide compound in this first oxidation step is in most cases higher than or equal to 0.05% by weight of dry native starch, especially higher than or equal to 0.1% by weight, more preferably higher than or equal to 0.5% by weight, especially higher than or equal to 1% by weight, for example higher than or equal to 2.

The pH of said first oxidation step is preferably adjusted to a value of more than or equal to 9, preferably of more than 9, and of less than or equal to 12.5. An especially suitable pH range for this first oxidation step is from more than 9 to 12.5, preferably from 9.5 to 12, for instance around 10 or 11. In a preferred embodiment, if the oxidizing agent is an alkali metal hypochlorite, the pH of the reaction mixture in the first oxidation step is adjusted to a value from 9 to 11, preferably around 10. In another preferred embodiment, if the oxidizing agent is a peroxide compound, the pH of the reaction mixture in the first oxidation step is adjusted to a value from 10 to 12.5, especially around 11. The pH is preferably adjusted prior to the addition of the oxidizing agent, to avoid degradation of the oxidizing agent, which could occur if the pH of the aqueous composition to which the oxidizing agent is added is too low or too high, in particular if the pH is below 9. Indeed, without being bound by any theory, it is believed that the degradation reaction of the oxidizing agent could be faster than the oxidation reaction of the starch, if the pH of the reaction medium is below 9. The pH is advantageously adjusted to a value of maximum 12.5, to avoid decreasing the temperature of the gelatinization of the native starch below the working temperature. Working at a pH above 12.5 would also be less economical. The pH is typically adjusted by the addition of at least an alkaline compound selected from any water soluble base known in the art such as soluble inorganic alkaline and alkaline earth hydroxides, carbonates or bicarbonates, for example with sodium hydroxide, potassium hydroxide, sodium carbonate, or sodium bicarbonate. In a further preferred embodiment, the pH of the reaction mixture in the first oxidation step is maintained substantially constant during the whole duration of the first oxidation step, especially as long as some oxidizing agent is added to the reaction mixture.

In an especially preferred embodiment, the pH of the two oxidation steps differ by at least 0.5 pH units, preferably at least 1 pH unit. Advantageously, the first oxidation step (oxidation of native starch) is conducted at a pH higher than the pH of the second oxidation step (oxidation of native starch and already oxidized starch). Without being bound by any theory, it is thought that the pH has an impact on the degree of oxidation and the degree of hydrolysis of the starch.

In a further preferred embodiment, the present invention relates to a process for the manufacture of oxidized starch comprising the following steps:
(a) reacting an aqueous slurry of native starch at a pH from 9 to 12.5 with at least one oxidizing agent selected from a peroxide compound or from an alkali metal hypochlorite, the reaction being conducted in the presence of a homogeneous manganese-based complex coordination catalyst if the oxidizing agent is a peroxide compound,
(b) adding a further amount of native starch to the slurry resulting from step (a), thus forming an aqueous medium comprising already oxidized starch and native starch,
(c) adjusting the pH of the slurry from step (b) to a value of from 9 to 11,
(d) optionally adding a further amount of a homogeneous manganese-based complex coordination catalyst if the oxidizing agent added in step (e) is a peroxide compound,
(e) adding a further amount of at least one oxidizing agent selected from a peroxide compound or from an alkali metal hypochlorite, and
(f) optionally repeating steps (b) to (e).

According to this further embodiment, the oxidizing agent used in steps (a) and (e) may be the same or may be different. These oxidizing agents are preferably the same in steps (a) and (e).

In a first embodiment, the process may comprise the steps (a) to (e) and no optional step (f). In a second embodiment, the process of the invention may comprise more than two oxidation steps, by repeating at least once the steps (b) to (e). Preferably, the process of the invention comprises two oxidation steps corresponding to steps (a) and (e), and thus no additional step (f).

In any embodiment of the process of the present invention, the oxidation reaction, either of the native starch (first oxidation step) or of the mixture of already oxidized starch and native starch, is carried out at a temperature below the gelatinization temperature of the native starch and of the oxidized starch, in particular at a temperature below the solubilization temperature of the native starch and of the oxidized starch. The oxidation reaction is typically carried out at a temperature maintained below 50° C. If the oxidizing agent is a peroxide compound, the reaction is preferably conducted at a temperature from 18 to 40° C., more preferably at a temperature from 20 to 26° C., in particular at room temperature. If the oxidizing agent is an alkali metal hypochlorite, the reaction is advantageously conducted at a temperature from 25 to 45° C., especially at a temperature around 35 to 40° C.

The duration of the oxidation reaction, either of the native starch (first oxidation step) or of the mixture of already oxidized starch and native starch, is usually from 30 minutes to 6 hours, preferably from 45 minutes to 4 hours. If the oxidizing agent is a peroxide compound, the duration of the oxidation reaction is preferably from 30 minutes to 2 hours, more preferably from 45 minutes to 1.5 hours for instance around 1 hour. If the oxidizing agent is an alkali metal hypochlorite, the duration of the reaction is advantageously from 2 to 6 hours, especially from 3 to 5 hours, for example around 4 hours.

The process of the invention can be carried out in any adequate oxidation reactor. Example of a suitable reactor is a double-jacket glassware reactor equipped with a stirrer, the reactor having the appropriate volume in order to perform the at least one oxidation reactions in the same reactor. Another example is a system with at least two reactors arranged in series. According to such a system, the first oxidation step is performed in a first reactor then the content of the first reactor is discharged in the second reactor for the second oxidation step. If further oxidation steps are planned, further reactors can be part of the system.

After the oxidation reaction of the process of the present invention, if necessary, the residual hydrogen peroxide or the residual hypochlorite can be destroyed by any conventional method such as the use of reducing agents, for example sodium thiosulfate or sodium bisulfite. The residual hydrogen peroxide can also be destroyed through the use of enzymes, for example catalase. The pH of the reacting mixture resulting from the process of the present invention can thus be neutralized to a pH value close to 7 by adding any acid known in the art, for example sulfuric acid or chlorhydric acid. Then, the oxidized starch can be separated from the reacting mixture by any adequate separating method such as filtration and can optionally be washed with demineralized water. The separated oxidized starch can be dried by any adequate drying method for instance in a drying oven at temperatures from 20 to 120° C., preferably from 40 to 100° C. Drying temperature is preferably lower than 60° C. at least in the initial stage of the drying and is increased as the moisture content in the oxidized starch decreases.

The present invention also relates to the oxidized starch obtainable by the process described above and its various embodiments.

It has been found that a useful additive for the paper industry and for the food industry must be soluble in water at temperatures above 50° C., must present an appropriate viscosity in solution (as explained below), and that this viscosity must remain relatively stable in time. It is therefore recommended to control the viscosity of the resulting oxidized starch in the process of the invention.

Viscosity of the oxidized starch in solution is important for applications such as those of the paper industry and of the food industry. The oxidized starch of the invention generally presents, in an aqueous solution of about 30% by weight of dry starch and at 50° C., a viscosity of from 10 to 200 mPa·s, in particular of from 30 to 170 mPa·s, and most preferably from 50 to 160 mPa·s. The viscosity in solution is measured according to the method described in the examples below.

The viscosity of the oxidized starch of the invention is stable in time. Indeed, it often occurs that, on cooling and/or on ageing, there is a rise in viscosity, an appearance of turbidity or a solidification of the starch solution. This stability is measured by measuring the viscosity of the above-mentioned solution before and after an ageing of 24 hours in an oven at 50° C. In the process of the invention, oxidized starch having a viscosity stable in time means that the oxidized starch does not form a gel, the viscosity of which cannot be measured anymore. Especially, this means that the viscosity of the oxidized starch solution after ageing is of maximum 200 mPa·s. Generally, the viscosity after ageing does not increase or decrease by more than 60% compared to the viscosity of the solution before ageing, preferably by more than 50%, especially by more than 40%.

Especially suitable oxidized starch according to the invention has a carboxylic content of from 0.4 to 2.0%, especially from 0.6 to 1.2%, values around 1% being particularly advantageous.

The oxidized starch obtainable by the process of the present invention has typically a multimodal distribution of molecular weight, in particular a bimodal distribution of molecular weight. The term "multimodal distribution of molecular weight" has the meaning that the product exhibits a molecular weight statistical distribution of values with multiple peaks, i.e., that the product is composed of at least two identified fractions: one having a low molecular weight and a high carboxylic content and another one having a higher molecular weight and a lower carboxylic content. For example, a first fraction may have an average molecular weight below 150,000 g/mol, especially from 30,000 to 100,000 g/mol and a second fraction may have an average molecular weight above 150,000 g/mol.

The oxidized starch of the invention can advantageously be used as an additive for the paper industry or for the food industry. The present invention therefore also relates to the use of the above-described oxidized starch as an additive for the paper industry or for the food industry. In the paper industry, it is especially suitable as coating binder or for the surface sizing of paper. In the food industry it can be used as an adhesive or as a binding agent.

The process of the present invention is especially advantageous as it allows the manufacture of oxidized starch having a higher viscosity for the same level of carboxylic content compared to known processes. Furthermore, depending on the amount of native starch combined with the already oxidized starch and on the amount of oxidizing agent and on the amount of catalyst, products having different characteristics, particularly different viscosities, can be obtained. Tailor made oxidized starch can thus be prepared using the process of the present invention.

The present invention is further illustrated below without limiting the scope thereto.

EXAMPLES

Example 1

Comparative 250 g of native potato starch has been blended with water at room temperature in order to obtain a slurry having a dry matter content of 50%. To that slurry was added 65 ppm of catalyst DRAGON A350 from Rahu Catalytics Ltd based on the dry starch content. The pH was then adjusted to 11.3 by addition of NaOH (concentration of 1N). When the pH had reached the value of 11.3, a dose corresponding to 0.416% of hydrogen peroxide expressed as 100% and related to the amount of dry starch was added. The pH was maintained constant by continuous addition of NaOH. The addition of peroxide was repeated 6 times, every 10 minutes, until having reached a total amount of 2.5% by weight of dry starch. The hydrogen peroxide was added in the form of an aqueous solution containing 9% by weight of $H_2O_2$.

At the end of the reaction, the residual peroxide was neutralized by adding a small excess of sodium bisulfate ($NaHSO_3$). The pH of the slurry was then brought to a value close to 7.0 by addition of sulfuric acid or sodium hydroxide (concentration of 1N). The obtained slurry was filtered and the oxidized starch was washed three times with demineralized water and dried in an oven at 50° C. during 16 hours.

The resulting oxidized starch was characterized by measuring its carboxylic acid content and its viscosity in solution at 50° C. The stability of the solution was also evaluated by measuring the viscosity after storage during 24 hours in an oven at 50° C. The viscosity in solution was measured by preparing an aqueous suspension containing 30% by weight of dry starch. This suspension was heated up to about 85° C. using a water bath. The oxidized starch went into solution. The viscosity of this solution was measured at 50° C. using a viscometer of the Brookfield type (Model DV-II+). The viscosity was 20 mPa·s and, after ageing, 50 mPa·s (increased by 150% compared to the initial viscosity). The amount of carboxylic acid group was 0.8% on dry basis (method ISI 10). The yield of recovered starch was 90% of the initial amount used for the experiment.

Example 2

According to the Invention

The first oxidation step was performed in the same conditions as described in Comparative Example 1.

At the end of the reaction, 25 g of native potato starch (10% by weight of the amount of native starch present in the first oxidation step) was added to the slurry and the pH was adjusted to 10.3 by adding sulfuric acid (concentration of 1N). A new dose of catalyst DRAGON A350 from Rahu Catalytics Ltd, corresponding to 50 ppm of the native starch added in this second oxidation step, was then added. Hydrogen peroxide was added in 6 times every 10 minutes in order to add a total amount of 1.25% of hydrogen peroxide expressed as 100% and related to the amount of the native starch added in the second oxidation step. The hydrogen peroxide was added in the form of an aqueous solution containing 9% by weight of $H_2O_2$. The pH was maintained constant during the reaction.

At the end of the reaction, the slurry was treated as explained in Comparative Example 1.

The resulting oxidized starch had an amount of carboxylic acid groups of 1.00% on dry basis (method ISI 10). The viscosity of a solution comprising 28% by weight of dry starch, measured at 50° C. using the same viscometer as in Comparative Example 1 was 75 mPa·s and, after ageing, 103 mPa·s (increased by 37% compared to the initial viscosity). The yield of recovered starch was 90% of the initial amount used for the experiment.

Example 3

According to the Invention

The first oxidation step was performed in the same conditions as described in Comparative Example 1.

At the end of the reaction, 40 g of native starch (16% by weight of the amount of native starch present in the first oxidation step) was added to the slurry and the pH was adjusted to 10.3 by adding sulfuric acid (concentration of 1N). A new dose of catalyst DRAGON A350 from Rahu Catalytics Ltd, corresponding to 50 ppm of the native starch added in this second oxidation step, was then added. Hydrogen peroxide was added in 6 times every 10 minutes in order to add a total amount of 1.25% of hydrogen peroxide expressed as 100% and related to the amount of the native starch added in the second oxidation step. The hydrogen peroxide was added in the form of an aqueous solution containing 9% by weight of $H_2O_2$. The pH was maintained constant during the reaction.

At the end of the reaction, the slurry was treated as explained in Comparative Example 1.

The resulting oxidized starch had an amount of carboxylic acid groups of 1.00% on dry basis (method ISI 10). The viscosity of a solution comprising 25% by weight of dry starch, measured at 50° C. using the same viscometer as in Comparative Example 1 was 137 mPa·s and, after ageing, 151 mPa·s (increased by 10% compared to the initial viscosity). The yield of recovered starch was 90% of the initial amount used for the experiment.

Example 4

Comparative 275 g of native potato starch (corresponds to 250 g+25 g as in steps 1 and 2 of Example 2) has been blended with water at room temperature in order to obtain a slurry having a dry matter content of 50%. To that slurry was added 70 ppm of catalyst DRAGON A350 from Rahu Catalytics Ltd based on the dry starch content (corresponds to 65 ppm of 250 g+50 ppm of 25 g as in Example 2).

The pH was then adjusted to 11.3 by addition of NaOH (concentration of 1N). When the pH had reached the value of 11.3, a dose corresponding to 0.379% of hydrogen peroxide expressed as 100% and related to the amount of dry starch was added (corresponds to 0.416% of hydrogen peroxide calculated on 250 g of starch of step 1 of Example 2). The pH was maintained constant by continuous addition of NaOH. The addition of peroxide was repeated 6 times, every 10 minutes, until having reached a total amount of 2.27% by weight of dry starch (corresponds to 2.5% calculated on 250 g of starch of step 1 of Example 2. The hydrogen peroxide was added in the form of an aqueous solution containing 9% by weight of $H_2O_2$.

The pH was adjusted to 10.3, then hydrogen peroxide was added in 6 times every 10 minutes in order to add a total amount of 0.114% of hydrogen peroxide expressed as 100% an related to the amount of the native starch (corresponds to 1.25% calculated on 25 g of starch of step 2 of Example 2). The hydrogen peroxide was added in the form of an aqueous solution containing 9% by weight of $H_2O_2$. The pH was maintained constant during the reaction.

At the end of the reaction, the slurry was treated as explained in Comparative Example 1.

The resulting oxidized starch had an amount of carboxylic acid groups of 1.04% on dry basis (method ISI 10). The viscosity of a solution comprising 30% by weight of dry starch, measured at 50° C. using the same viscometer as in Comparative Example 1 was 32.0 mPa·s and, after 24 h ageing, 34.2 mPa·s (increased by 37% compared to the initial viscosity). As in Comparative Example 1, this viscosity is much too low.

Should the disclosure of any patents, patent applications, and publications which are incorporated herein by reference conflict with the description of the present application to the extent that it might render a term unclear, the present description shall take precedence.

The invention claimed is:

1. A batch process for the manufacture of oxidized potato starch, comprising contacting an aqueous medium comprising already oxidized potato starch with native potato starch and with at least one oxidizing agent which is a peroxide compound, and reacting them at a temperature below the gelatinization temperature of the native potato starch and of the oxidized potato starch, the reaction being conducted in the presence of a homogeneous manganese-based complex coordination catalyst.

2. The process according to claim 1, wherein the amount of the native potato starch is of from 1 to 150% by weight of the amount of the already oxidized potato starch.

3. The process according to claim 1, wherein said oxidizing agent is selected from the group consisting of hydrogen peroxide, sodium percarbonate, sodium perborate and peracids.

4. The process according to claim 1, wherein the amount of said oxidizing agent is less than or equal to 10% by weight of the native potato starch.

5. The process according to claim 1, wherein said oxidizing agent is added progressively to the aqueous medium of the native potato starch and the already oxidized potato starch.

6. The process according to claim 1, wherein said homogeneous manganese-based complex coordination catalyst is a mononuclear or dinuclear complex of a Mn(III) or Mn(IV) transition metal.

7. The process according to claim 1, wherein said catalyst is present in the aqueous medium in a total amount consisting of a first amount based on the weight of the already oxidized potato starch and of a second amount based on the weight of the native potato starch, the first amount being of from 10 to 500 ppm based on the weight of the already oxidized potato starch, and the second amount being of from 0 to 500 ppm based on the weight of the native potato, starch.

8. The process according to claim 1 wherein the native potato starch is added to the aqueous medium comprising the already oxidized potato starch prior to the addition of said oxidizing agent, forming a slurry, and wherein the pH of said slurry is adjusted, prior to the addition of said oxidizing agent, to a value of from 9 to 11.

9. The process according to claim 1 wherein the already oxidized potato starch is obtained in a first oxidation step by reacting an aqueous slurry of native potato starch at a pH from 9 to 12.5 with at least one oxidizing agent which is a peroxide compound, the reaction being conducted in the presence of a homogeneous manganese-based complex coordination catalyst.

10. The process according to claim 9, wherein said slurry of the native potato starch in the first oxidation step initially contains at least 20% by weight of dry potato starch, and wherein the amount of said oxidizing agent in the first oxidation step is less than or equal to 10% by weight calculated on the basis of the weight of dry potato starch.

11. The process according to claim 1, comprising the steps of:
    (a) reacting an aqueous slurry of native potato starch at a pH from 9 to 12.5 with at least one oxidizing agent which is a peroxide compound, the reaction being conducted in the presence of a homogeneous manganese-based complex coordination catalyst,
    (b) adding a further amount of native potato starch to the slurry resulting from step (a), forming an aqueous medium comprising already oxidized potato starch and native potato starch,
    (c) adjusting the pH of the slurry from step (b) to a value of from 9 to 11,
    (d) optionally adding a further amount of a homogeneous manganese-based complex coordination catalyst,
    (e) adding a further amount of an oxidizing agent which is a peroxide compound, and
    (f) optionally repeating steps (b) to (e).

12. The process according to claim 1, said process produces an oxidized potato starch with a viscosity of from 10 to 200 mPa·s at 50° C. in an aqueous solution of 30% by weight of dry starch.

13. The process according to claim 1, said process produces an oxidized potato starch with a multimodal distribution of molecular weight.

* * * * *